United States Patent
Dalhuijsen

(10) Patent No.: US 6,378,019 B1
(45) Date of Patent: Apr. 23, 2002

(54) METHOD AND SYSTEM FOR INTERFACING A PLURALITY OF PERIPHERAL DEVICES IN A SLAVE GROUP INTERFACE DEVICE TO A BUS AND A SLAVE GROUP INTERFACE DEVICE

(75) Inventor: Cornelis G. Dalhuijsen, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/253,083

(22) Filed: Feb. 19, 1999

(30) Foreign Application Priority Data

Feb. 25, 1998 (EP) .............................................. 98200596

(51) Int. Cl.[7] .............................................. G06F 13/00
(52) U.S. Cl. ...................... 710/129; 710/101; 710/126
(58) Field of Search ............................... 710/100–105, 710/126–132, 36–45, 2

(56) References Cited

U.S. PATENT DOCUMENTS

| | | | | |
|---|---|---|---|---|
| 4,218,740 A | * | 8/1980 | Bennett et al. ............... | 710/60 |
| 4,794,525 A | * | 12/1988 | Pickert et al. ............... | 713/300 |
| 5,625,807 A | * | 4/1997 | Lee et al. ................... | 713/601 |
| 5,905,914 A | * | 5/1999 | Sakai et al. ................. | 364/188 |

OTHER PUBLICATIONS

OMI Oiun Inter University Network PI–BUS, http://www-.sussex.ac.wk/engg/research/vesi/projects/pibus/index.html.
OMI Open Microprocessor Systems Initiative; Press Release, "European Companies Develope High Speed On–Chip for Next Generation Processors", Sep. 11, 1995 by SGS Thomson.
Siemens, Open Microprocessor Initiative: Draft Standard: OMI 324: PI–Bus Rev. 0.3d.

* cited by examiner

Primary Examiner—Christopher B. Shin
(74) Attorney, Agent, or Firm—Steven R. Biren

(57) ABSTRACT

A plurality of peripheral devices are interfaced via a Slave Group Interface device to a bus. This allows for the transfer of clock signals, control signals including select signals, and information bits. In particular, the device ORs peripheral read data according to appropriate bit significance levels. In the absence of a write control signal all peripheral write data are maintained at an inconsequentiality level. Various control signals received from the peripheral devices are parallel-compacted to a compacted bus control signalization.

11 Claims, 10 Drawing Sheets

METHOD AND SYSTEM FOR INTERFACING A PLURALITY OF PERIPHERAL DEVICES IN A SLAVE GROUP INTERFACE DEVICE TO A BUS AND A SLAVE GROUP INTERFACE DEVICE

BACKGROUND OF THE INVENTION

Generally, a bus interconnects a plurality of stations and may allow various different communication patterns among those stations; in principle, a similar procedure can be followed if only a single peripheral is present. A particular example of such bus is the so-called PERIPHERAL INTERCONNECT or PI-bus that has been designed as a universal on-chip interconnection between stations that may be of diverse design origin. About the PI-bus the following electronic information is available on INTERNET:

www.sussex.ac.uk/engg/research/vlsi/projects/pibus/index.html

Given the fact that the stations may fulfil various diverse slave functions, they must be interconnected in a straight-forward and unencumbring manner; in particular, bus load should be kept low.

SUMMARY OF THE INVENTION

In consequence, amongst other things, it is an object of the present invention to provide a Slave Group Interface device that offers a generic interface to all or most peripheral types, and furthermore having the system require only modest bus transfer facilities.

Now therefore, according to one of its aspects the invention is characterized according to the characterizing part of claim 1. The 'information bits' may include data as well as addresses and the 'read' and 'write' functionalities are defined from the viewpoint of the bus. The read data will need only a narrow channel independent of the number of peripherals, write data and read data may use the same channel, and also the control signal channel may be kept relatively narrow.

The invention also relates to a system for implementing such method, and to a Slave Group Interface device arranged for use with such method. Further advantageous aspects of the invention are recited in dependent Claims.

Figure 1:
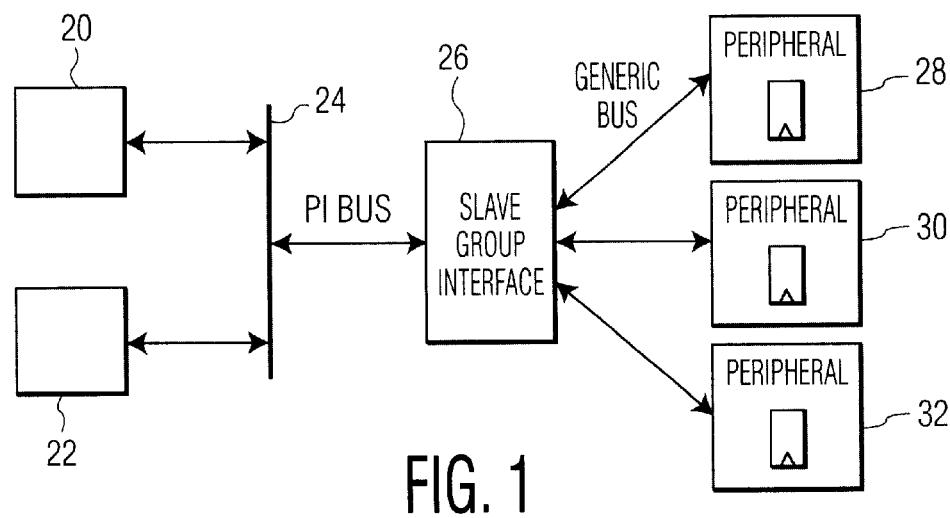
Figure 2:
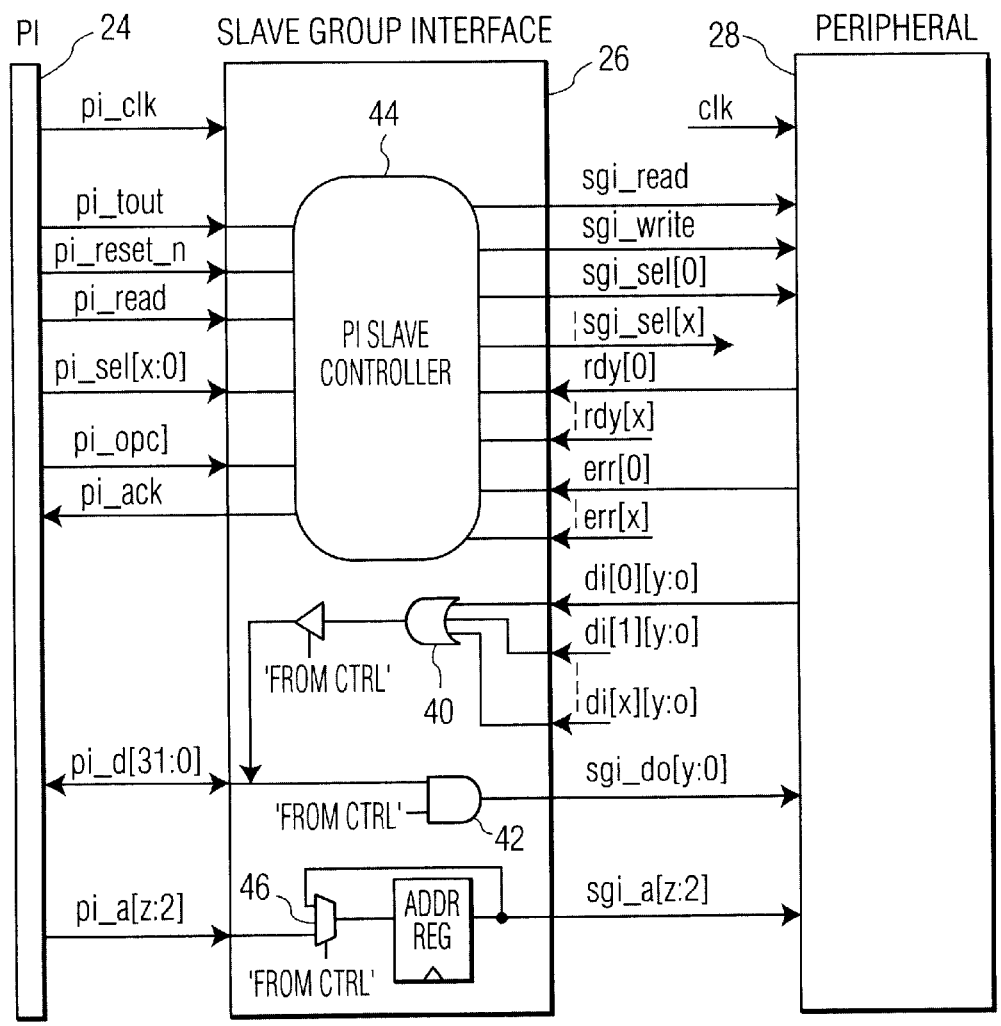
Figure 3:
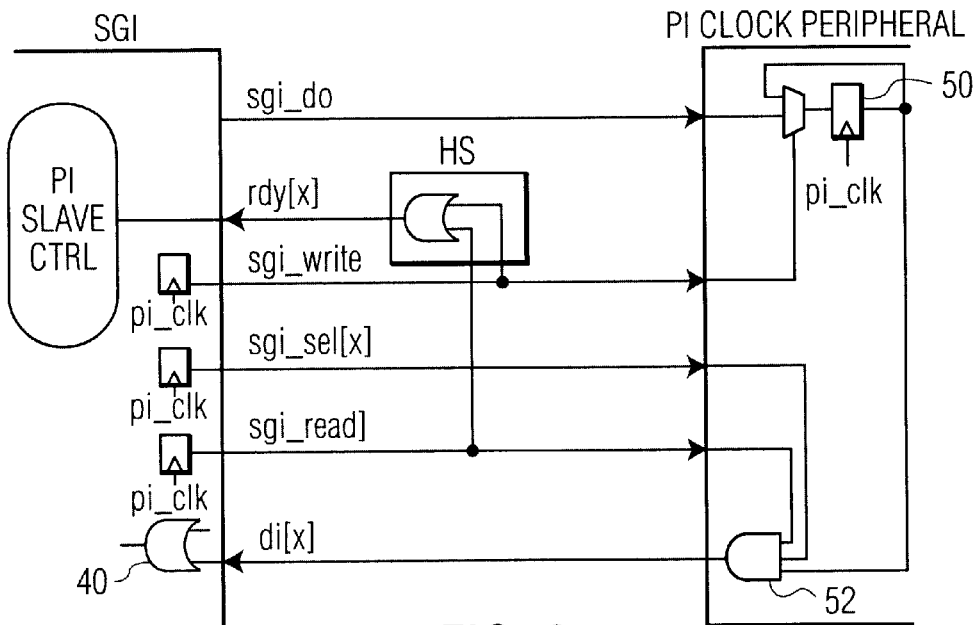
Figure 4:
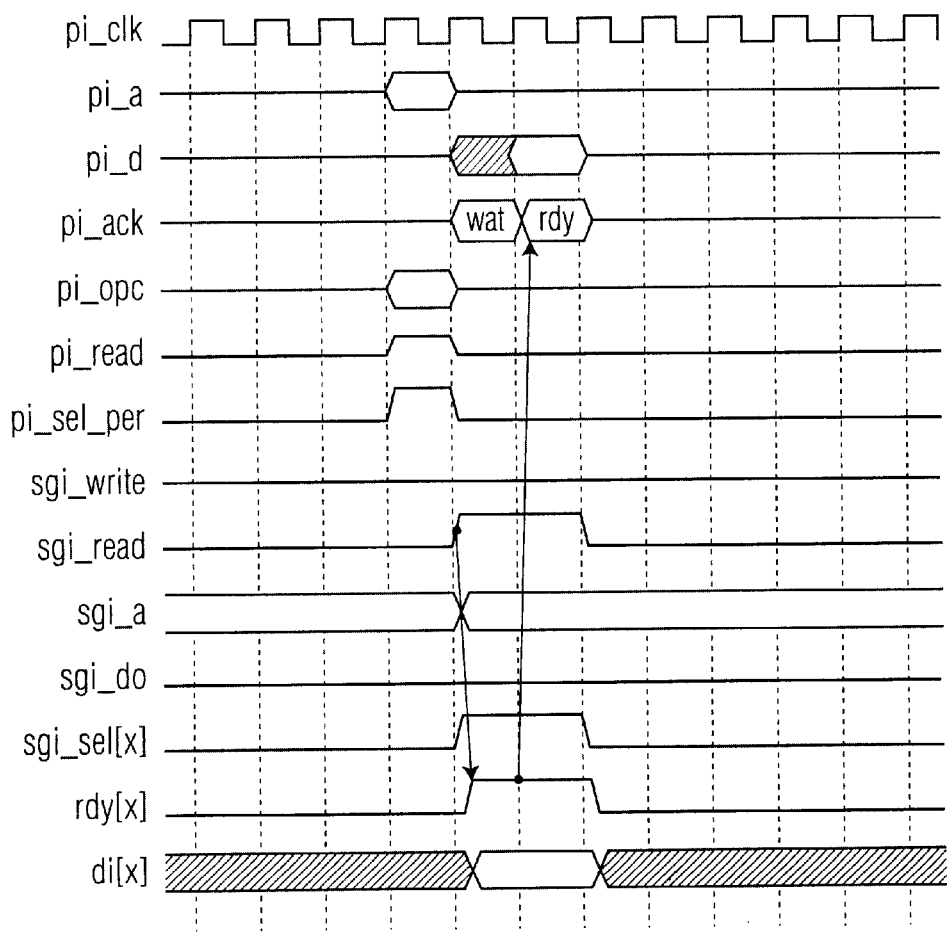
Figure 5:
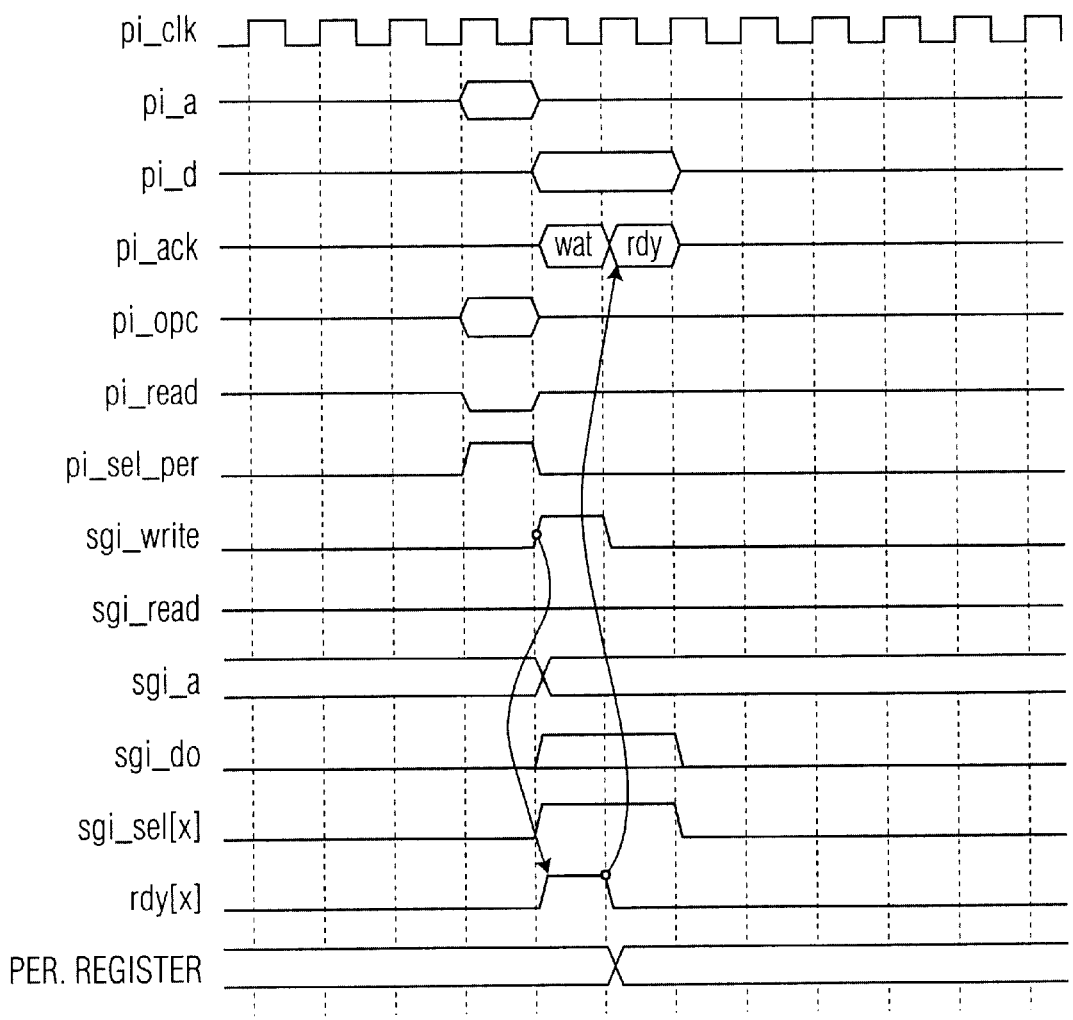
Figure 6:
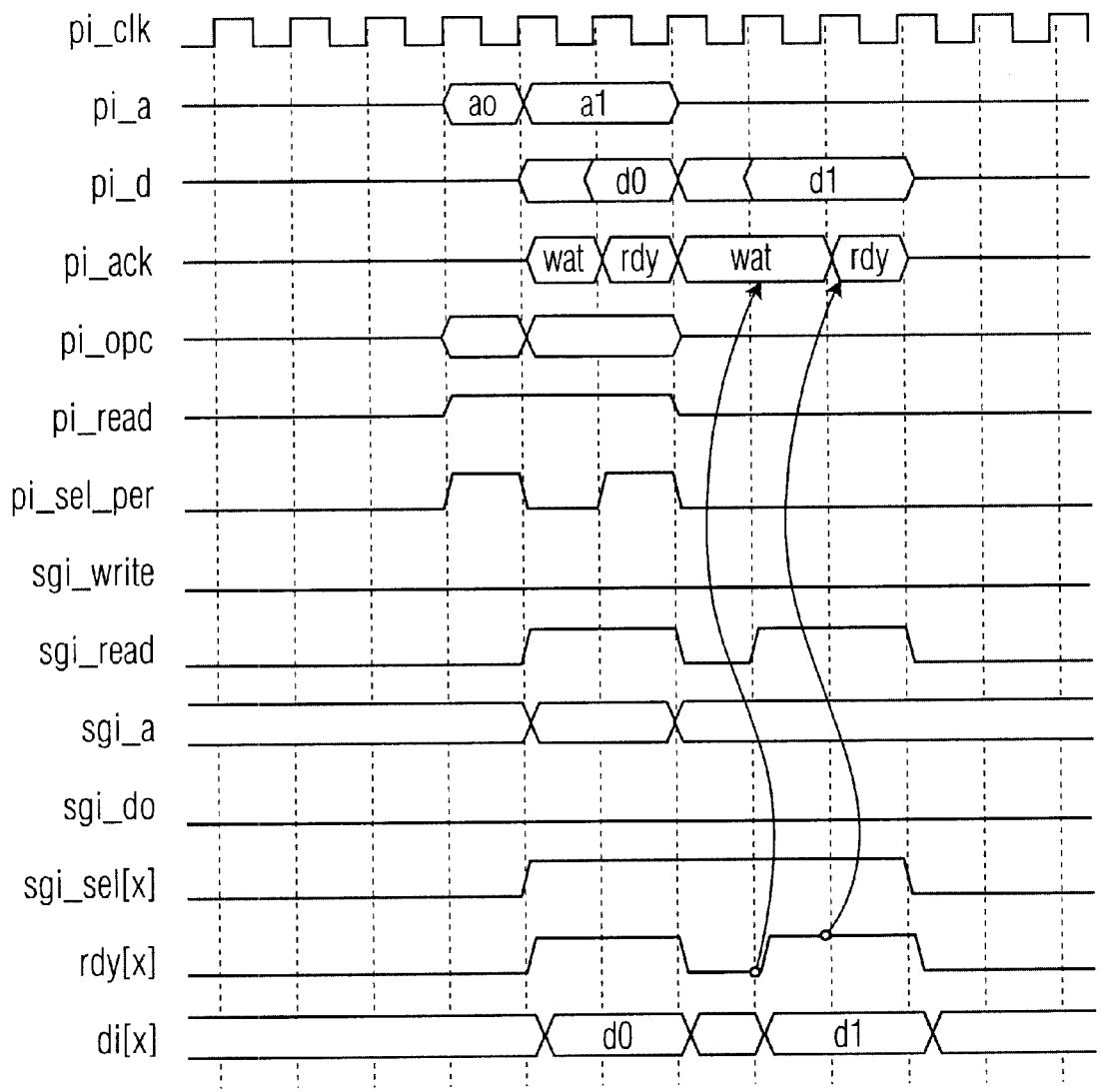
Figure 7:
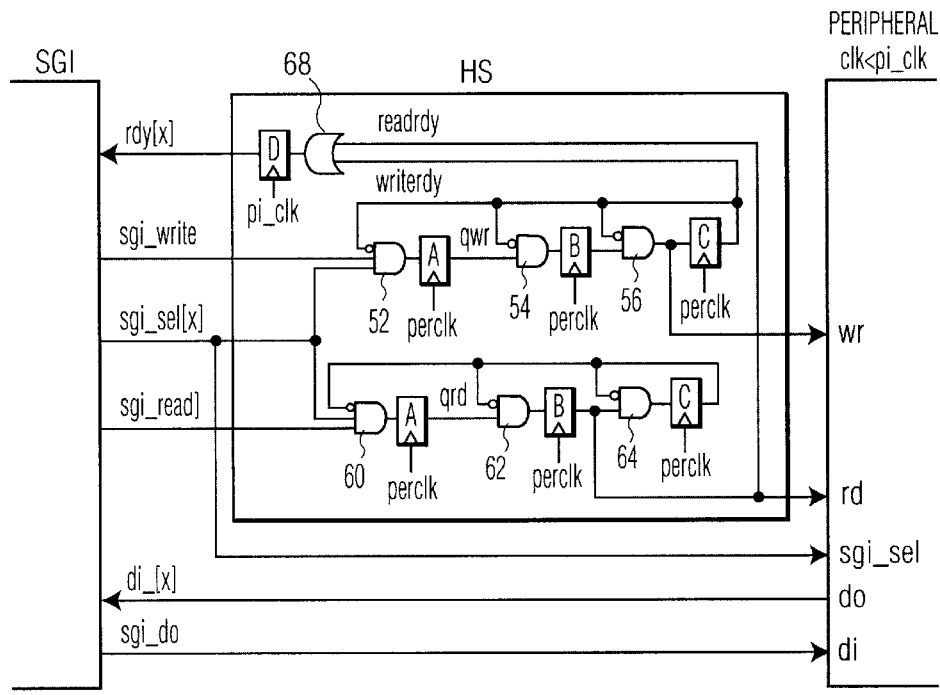
Figure 11:
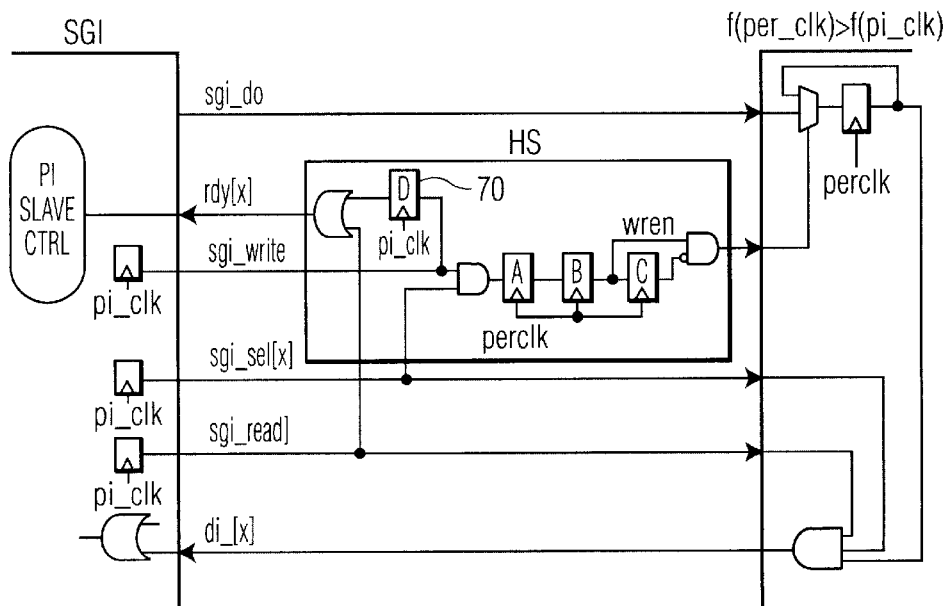
Figure 8:
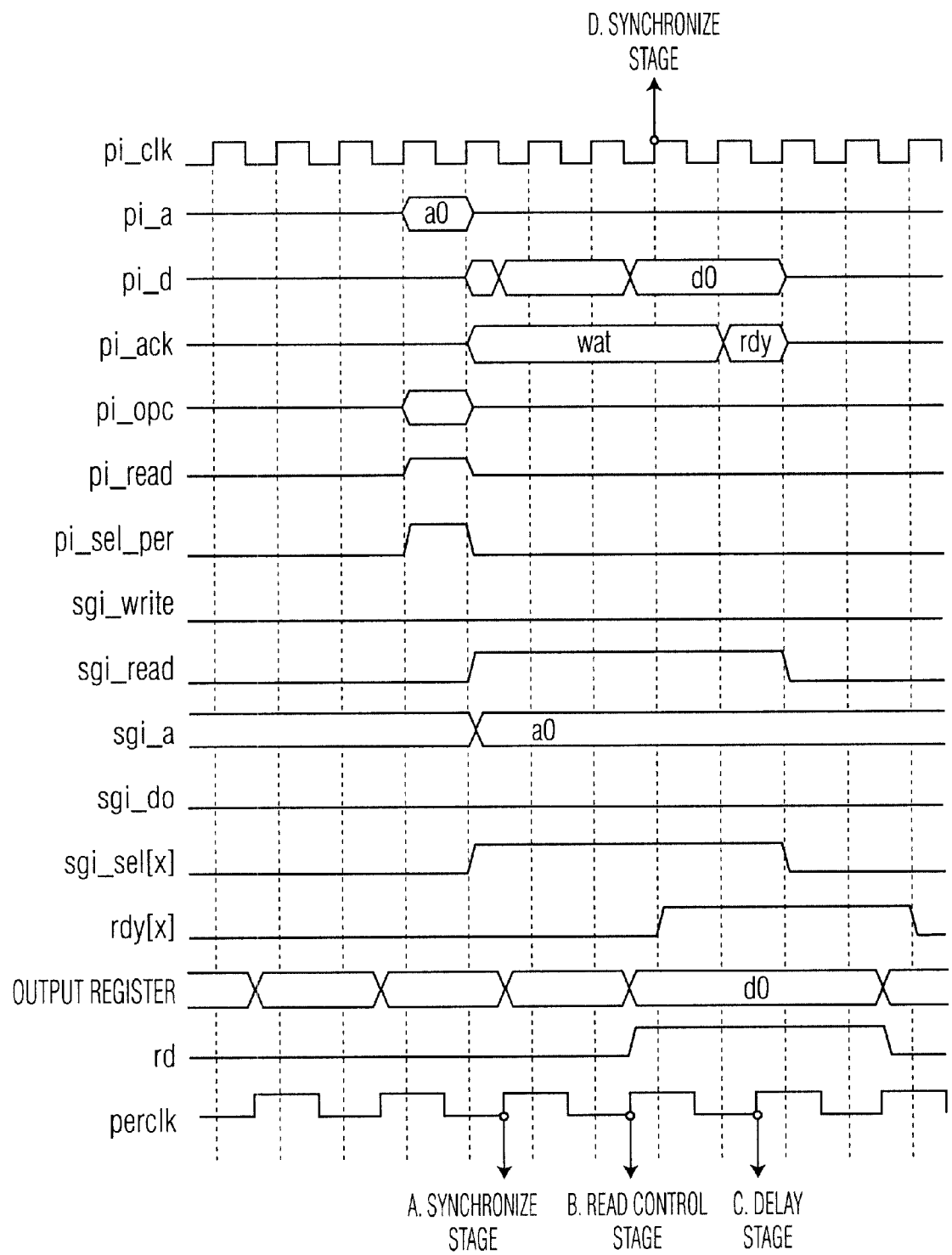
Figure 9:
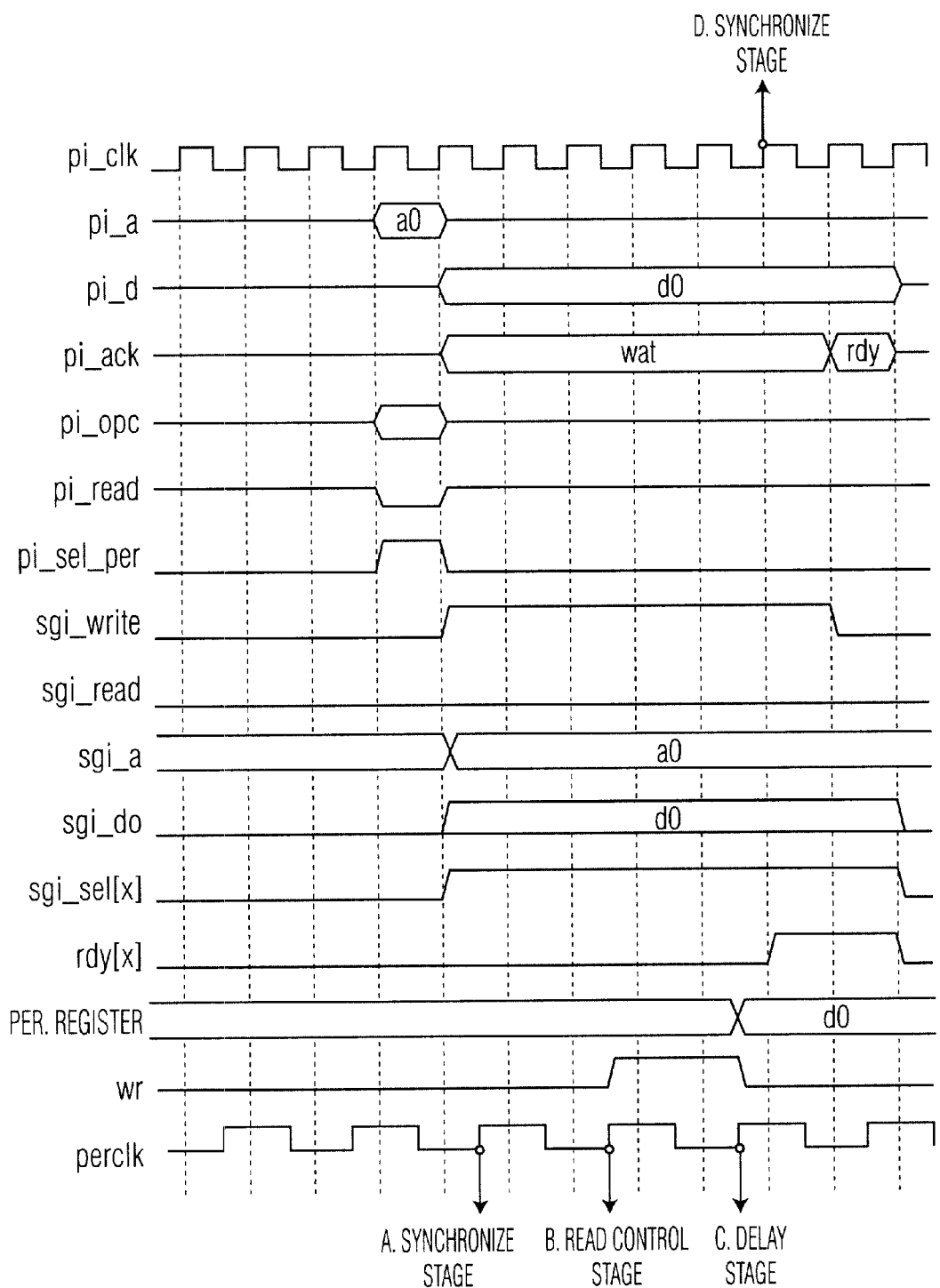
Figure 10:
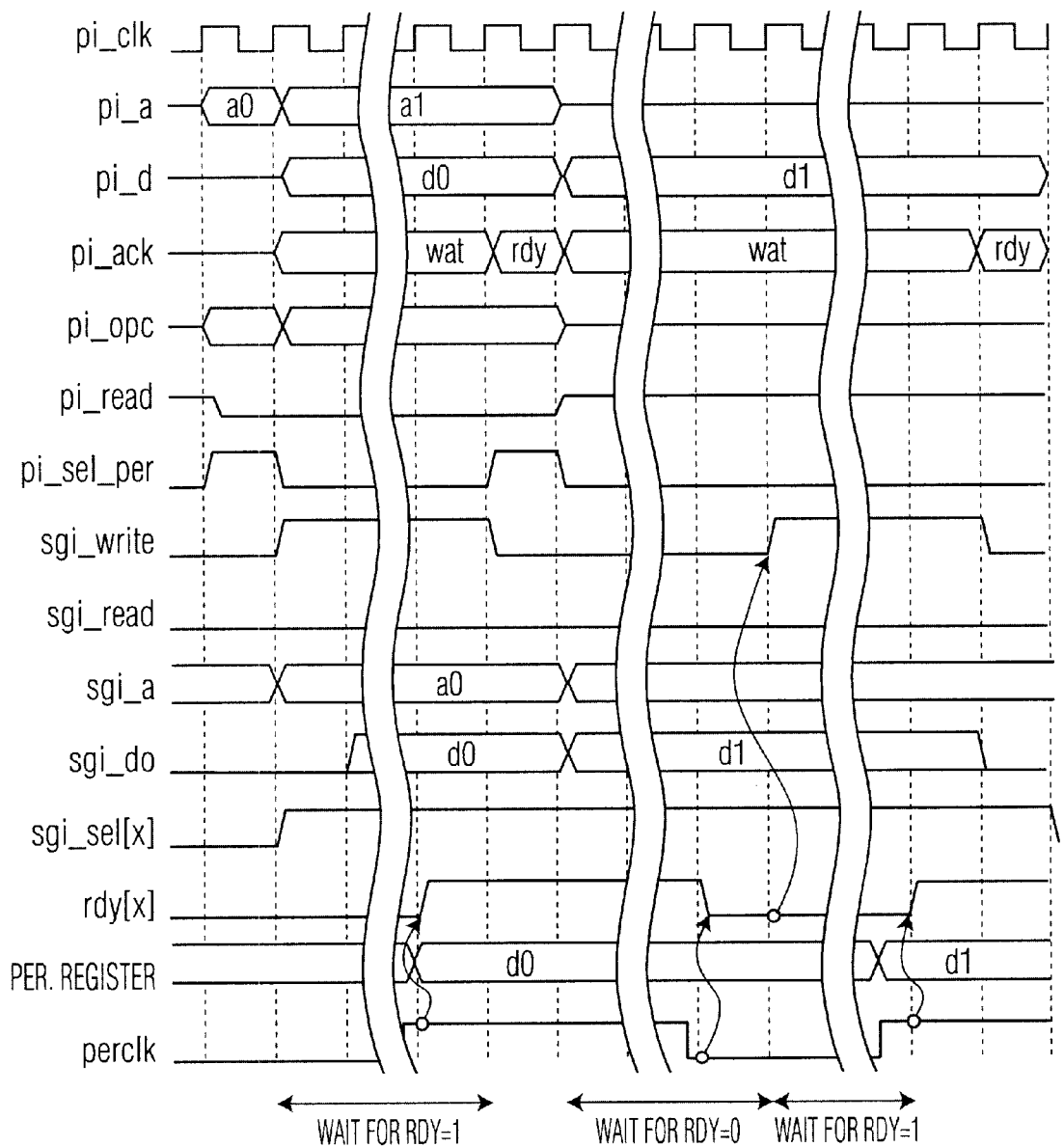
Figure 12:
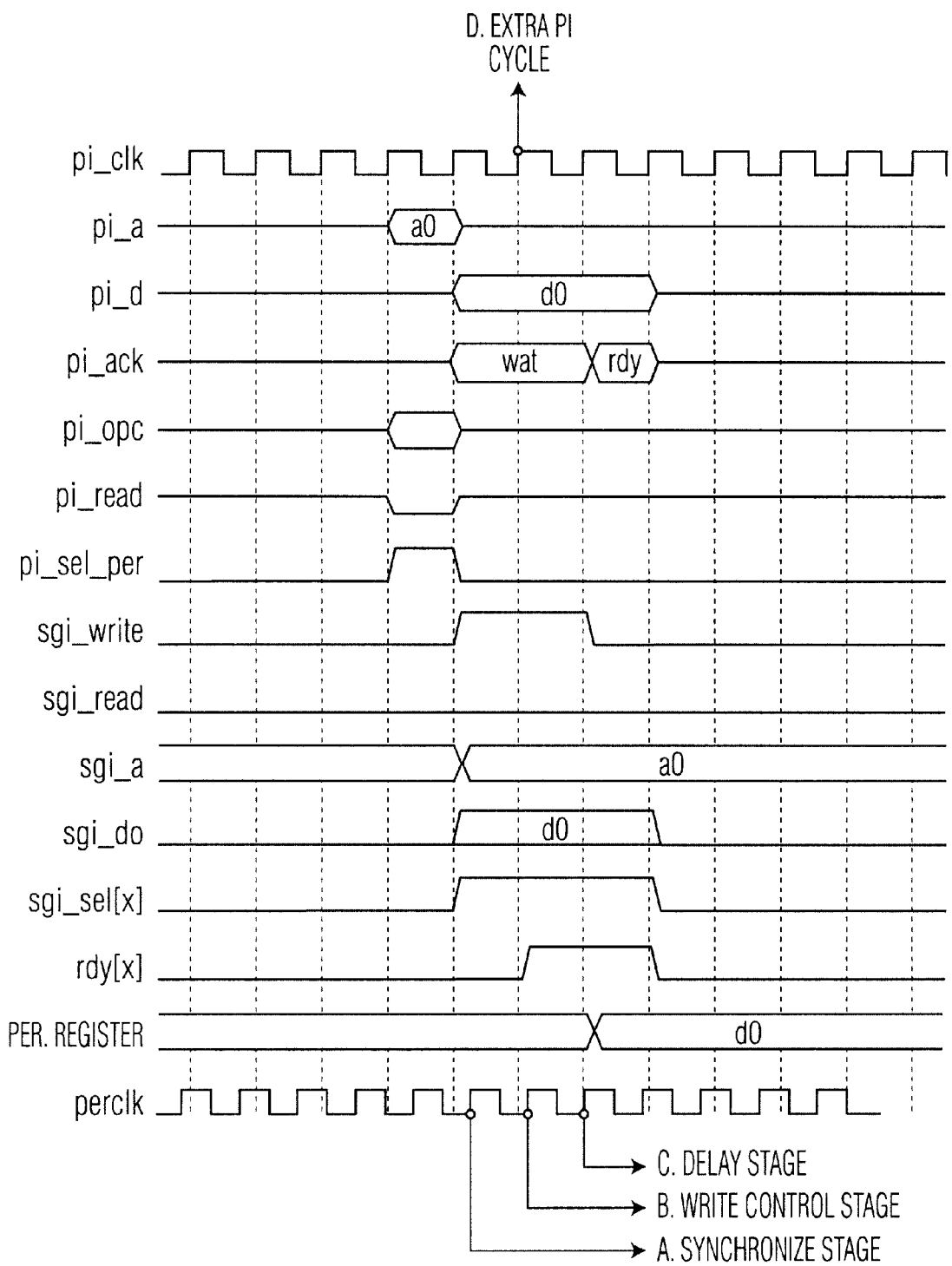
Figure 13:
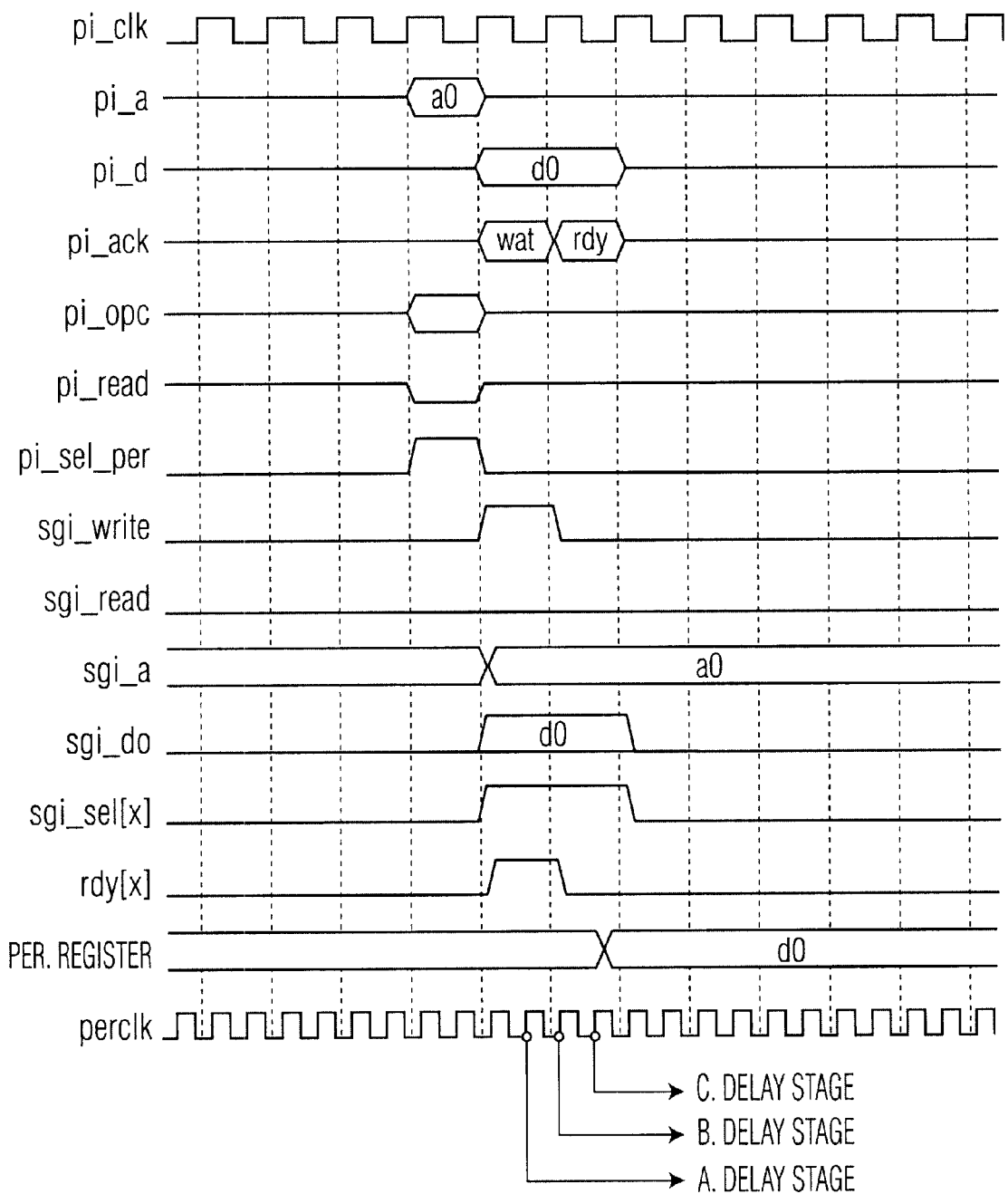

These and further aspects and advantages of the invention will be discussed more in detail hereinafter with reference to the disclosure of preferred embodiments, and in particular with reference to the appended Figures that show in:

FIG. 1, an overall diagram of a slave group interface;

FIG. 2, a detailed diagram of such interface device;

FIG. 3, connecting a peripheral to a Slave Group Interface;

FIG. 4, timing for read data from a peripheral;

FIG. 5, timing for write data to a peripheral;

FIG. 6, timing for burst data read from a peripheral;

FIG. 7, connecting a peripheral with a slower clock than the PI clock;

FIG. 8, timing for read data from such peripheral;

FIG. 9, timing for write data to such peripheral;

FIG. 10, timing for burst data write to such peripheral;

FIG. 11, connecting a peripheral with a faster clock than the PI clock;

FIG. 12, timing for data write to such peripheral;

FIG. 13, timing for data write to a peripheral with a still faster clock.

DESCRIPTION OF THE PREFERRED EMBODIMENT

FIG. 1 is an overall diagram of a slave group interface embodiment that may be realized on a single semiconductor chip. The set-up contains the central or so-called PI bus 24 that may be arranged according to IEEE specification 1394. On the left hand side this bus interfaces to primary master device 20, such as a central processing unit CPU and furthermore to interface device 22 for interconnecting to an external world. Also, further master devices as well as slave devices may be attached immediately to this side of the bus. On the right side, the bus interfaces to Slave Group Concentrator or Interface device 26. The latter device in its turn attaches to various slave peripherals 28, 30, 32, as shown, through various generic buses. For brevity, the possibly diverse nature of these slave devices has not been detailed.

FIG. 2 shows a detailed block diagram of such interface device, whilst repeating reference numerals from FIG. 1. Peripherals that are not selected during a Read operation must all present output zero, as the Slave Group Concentrator will merge all di data received through a logic OR construct (40). Likewise, the sgi_do output to the attached peripherals is kept zero by gating (42) as long as no write data is available for a connected peripheral. This is done to minimize the toggling of connected nodes in the peripherals and consequently to save power. The bus further interfaces to PI slave controller (44) by signals pi_clk, pi_tout signalling a PI time-out error, pi_reset_n for resetting a particular peripheral, pi_read, pi_sel[x:0] to select each separate peripheral, opcode pi_opc[4:0] specifying a data transfer type, and a three-bit acknowledge bus pi_ack[2:0]. Further, there are 32 data bits pi_d[31:0] and an address bus pi_a[z:2] based on the memory mapping width z for the peripherals. The selection of a particular peripheral may imply post-address decoding inside block 44, for subsequent addressing with respect to that particular peripheral. Also block 44 may measure the time necessary for address decoding.

The interface to the peripherals has peripheral clock clk and is further connected to controller 44 sgi_read, sgi_writ, sgi_sel[x:0], rdy[x:0], err[x:0]. The data width is di[x][y:0], sgi_do[y:0], and the address width sgi_a[z:2], that may be controlled selectively (46) to be latched in latch (48). The uncoupling of the peripheral clock from any master clock allows great freedom in the operation of the peripherals.

FIG. 3 illustrates the connecting of a peripheral that is driven in synchronism with the PI bus clock, to the Slave Group Interface device. The rdy ready signal is the logical OR (HS) of the read and write control signals. Data out is stored in latch 50 that in turn is ANDED (52) with the select and read control signals from the interface device.

FIG. 4 is a timing diagram for read data from a peripheral that is clocked in synchronism with the PI bus clock, wherein the arrows indicate causal relationships. The address from the PI bus is latched in register 48 and sent to the peripheral. The data read from the peripheral is transferred onto the PI bus, and the rdy signal is sent to the Slave Group Interface device.

FIG. 5 is a timing diagram for data write to a peripheral that is clocked in synchronism with the PI bus clock. The address from the PI bus is latched in register 48 and sent to the peripheral. The write data is sent to the peripheral and upon effecting the write control, the peripheral returns the rdy signal.

FIG. 6 is a timing diagram for transferring burst data read from a peripheral that is clocked in synchronism with the PI bus clock. The first read takes place in similar fashion as single data read considered earlier. During the second and later reads, the Slave Group Interface first waits until the rdy signal is low again, and then until return to high it makes sure that the most recent read cycle has indeed been accepted by the peripheral. As a consequence, second and later reads each take one additional wait cycle on the PI bus. The Slave Group Interface device keeps the read and write controls low while it waits for the rdy signal to become low.

FIG. 7 is a connecting diagram between the slave group interface and a peripheral that is clocked with a clock which is slower than the PI bus clock. Both Read and Write are synchronized to the peripheral clock. The Select line and Data lines are not synchronized. Changes from FIG. 3 include A, B, C, latches in both read and write controls, that are controlled by the peripheralclock. The write branch stores in selected latches the AND of the selection and write controls (52, 54, 56) unless the writeready signal is true. A similar chain has been provided with gates 60, 62, 64, for the read branch. The enable control signals to the peripheral are transiently signalled by AND/NAND gate 56, and at the input side of AND/NAND gate 64, respectively. The string of latches may be longer in correspondence with the machine cycle length of the peripheral device in question.

FIG. 8 is a timing diagram for data read from a peripheral that is clocked with a slower clock than the PI bus clock. A requirement for the peripheral device is that it must keep its output stable while it is being read. The read synchronization consists of four stages A–D. In stage A the sgi_read is synchronized to the peripheral clock. In stage B the peripheral read enable is activated. In stage C the previous stages are reset. In stage D the read ready indication, that returns to the Slave Group Interface device, is synchronized to the PI bus clock.

FIG. 9 is a timing diagram of a data write to a peripheral on a clock that is slower than the PI bus clock. The write synchronization consists of four stages A through D. In stage A the sgi_write is synchronized to the peripheral clock. In stage B the peripheral write enable is activated. In stage C the 'write ready' indication for the Slave Group Interface device is generated. In stage D the ready indication that goes back to the Slave Group Interface device, is synchronized to the PI bus clock.

FIG. 10 is a timing diagram for a burst data write to a peripheral with a slower clock than the PI clock. The select line will stay at one all during the burst. The write control sgi_write is made low after each write. When the second write starts, the ready signal of the first write is still active. The Slave Group Interface device will then wait until the ready signal becomes low before activating sgi_write. When the Slave Group Interface detects that ready is low, it will activate sgi_write and wait until ready will become 'one' again.

FIG. 11 shows the connection between the Slave Group Interface device and a peripheral that is clocked with a faster clock than the PI bus clock; in practice, this situation will not be very common. The "D"-flipflop (60) is used to get an additional PI clock cycle for rites, in order to have enough time to synchronize the signal sgi_write and generate the peripheral write control signal. If the peripheral clock is at least twice as fast as the PI clock, no PI clock cycle will be needed and flipflop D may be omitted. The write enable is delayed by three successive latches A–D.

FIG. 12 is a timing diagram for data write to a peripheral with a faster clock than the PI bus clock. Extra PI bus cycles are needed to compensate for the time used for synchronizing (stage A) and for generating the peripheral write signal (stage B). The frequency of the peripheral clock is less than twice the frequency of the PI Clock.

FIG. 13 is a timing diagram for data write to a peripheral on a still faster clock. If the peripheral clock is at least twice as fast as the PI bus clock, no extra PI clock cycle is needed for the time spent, to synchronize (stage A) and to generate the peripheral write signal (stage B).

What is claimed is:

1. A method for interfacing one or more peripheral devices by means of a Slave Group Interface device to a bus that allows to transfer bus clock signals, control signals including select signals, and furthermore information bits, comprising, in said Interface device, ORing peripheral read data according to appropriate bit significance levels, in the absence of a write control signal maintaining all peripheral write data at an inconsequentiality level, and parallel-compacting various control signals received from said peripheral devices to a compacted bus control signalization.

2. A method as claimed in claim 1, wherein said Slave Group Interface Device allows peripheral clocks that are independent from the bus clock as well as from each other, by physically separating said peripheral clocks and said bus clock.

3. A method as claimed in claim 1, further comprising providing a ready signal by a particular peripheral that is clocked at an actual bus clock frequency, by ORing a read control signal to the particular peripheral and a write control signal to the particular peripheral.

4. A method as claimed in claim 1 for synchronizing a transfer with respect to a particular peripheral with a peripheral clock that is slower than an actual bus clock frequency, comprising providing a ready signal by ORing a read control signal to the particular peripheral and a version of a write control signal to the particular peripheral after delay by successive peripheral clock signals.

5. A method as claimed in claim 1 for synchronizing a transfer with respect to a particular peripheral with a peripheral clock that is faster than an actual bus clock frequency, ORing a read control signal and an instantaneous write control signal to the particular peripheral, whilst loading data into the particular peripheral under control of a data write control signal after delay through successive peripheral clock signals.

6. A method as claimed in claim 1, comprising resetting said Slave Group Interface device under control of either of a BusReset signal or a BusTime-Out signal received from the bus.

7. A method as claimed in claim 1, comprising arranging to convert in said Slave Group Interface device an error signal specifying a particular peripheral into a bus error code.

8. A method as claimed in claim 1, wherein said Slave Group Interface device maintains a bus interface fully separate from any internal processing viz á viz signals associated to said peripheral devices.

9. A system comprising one or more peripheral devices interfaced by means of a Slave Group Interface device to a bus that has transfer facilities for clock signals, control signals including select signals, and furthermore information bits, said Interface device comprising OR means for ORing peripheral read data according to appropriate bit significance levels, block means for in the absence of a write control signal maintaining all peripheral write data at an inconsequentiality level, and compacting means for parallel-compacting various control signals received from said peripheral devices to a compacted bus control signalization.

10. A system as claimed in claim 9, wherein said system is on-chip and said bus is an on-chip PI bus.

11. A Slave Group Interface Device arranged for use with a method as claimed in claim 1, having bitwise OR means for ORing peripheral read data according to respective significance levels, block means for under absence of a write control signal maintaining all peripheral write data at an inconsequentiality level, and compacting means for parallel-compacting various control signals received from said peripheral devices to a compacted bus control signalization.

* * * * *